Patented Apr. 12, 1949

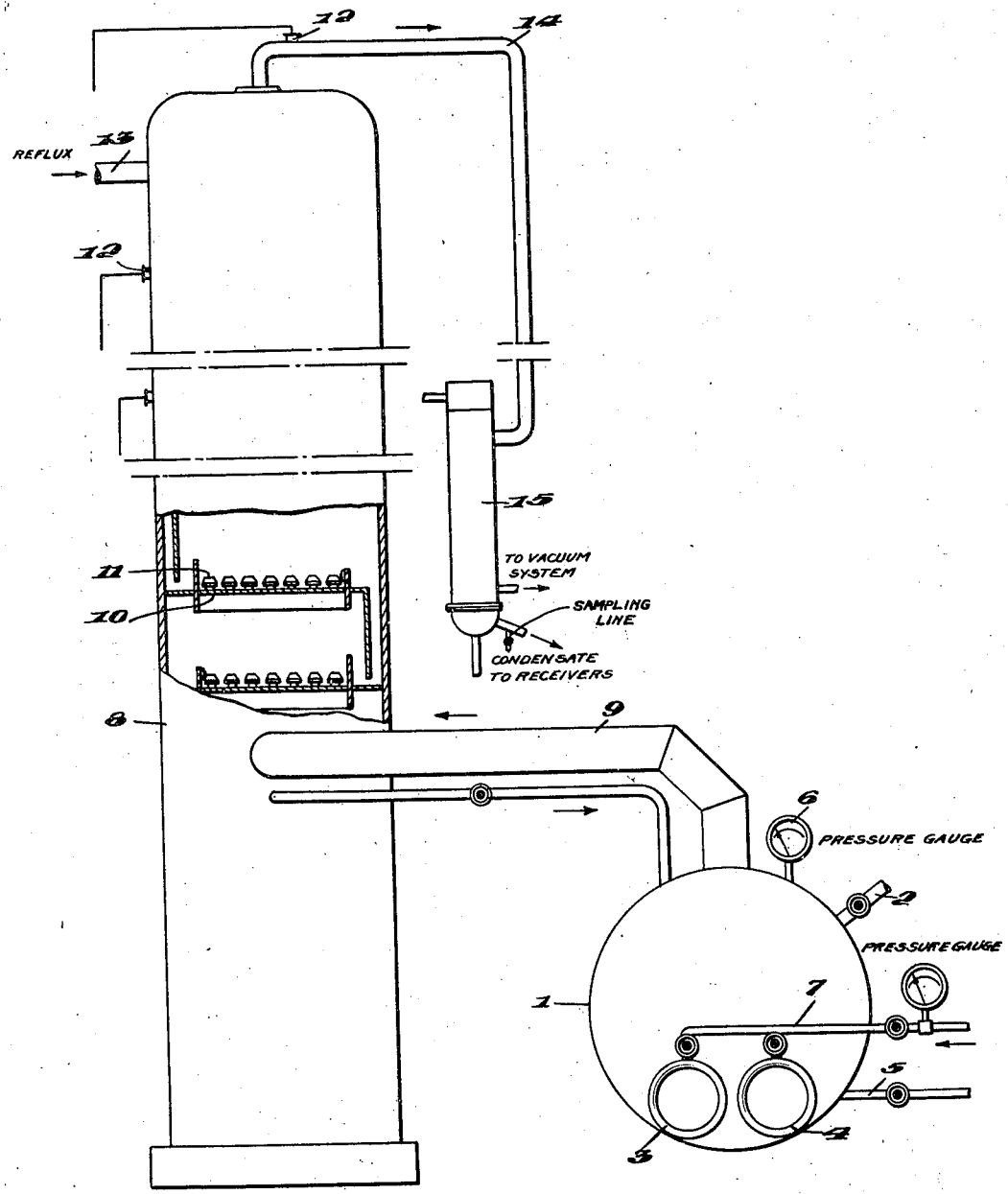

2,466,699

UNITED STATES PATENT OFFICE 2,466,699

SEPARATION OF ORTHOXYLENE FROM ISOMERIC XYLENES BY FRACTIONAL DISTILLATION

William L. Glowacki, Pittsburgh, Pa., assignor, by mesne assignments, to Koppers Company, Inc., a corporation of Delaware Application November 21, 1942, Serial No. 466,454

9 Claims. (Cl. 202—40)

This invention relates in general to methods of obtaining ortho-xylene of high purity from fuel-distillate oils containing it in admixture with its isomers meta-xylene and para-xylene. More particularly the invention relates to the treatment of light oil obtained as a fraction of coal tar or from coal gas plants, whereby relatively high yields of highly concentrated ortho-xylene are provided.

Light oil, as is well known, is obtained from coke-oven coal gas as a yellow-brown, highly complex mixture of hydrocarbons, and sulfur, oxygen and nitrogen compounds. The hydrocarbons include, among others, benzene, toluene and the xylenes, the latter being present generally to the extent of 4% to 8% and comprising chiefly meta-xylene. Many attempts have heretofore been made by chemical and other means to separate the isomeric xylenes in technically pure form on a commercial scale. Light oil plant operators, prior to the present invention, by means available to them, were never able to provide a concentrate containing much over 80% ortho-xylene.

For certain purposes, as for instance, in the synthesis of riboflavin, it is important to have ortho-xylene well over 90% pure. Specifications for technically pure ortho-xylene were not met without economic difficulty or without considerably increasing the cost of a synthesized product. Obviously, any added refining, particularly if complex and if done only in small batches, will augment the cost of the ultimate commodity.

It is now possible, by means of the process described and claimed hereinbelow, to prepare from fuel-distillate light oil with light oil plant equipment an ortho-xylene product of highly satisfactory purity at little added cost. In view of the small differences between the boiling points of ortho-xylene (B. Pt. 144° C.), meta-xylene (B. Pt. 139.0° C.), and para-xylene (B. Pt. 137.7° C.), separation of one from the other by simple physical methods has been considered difficult and infeasible. In the present method, as will be more particularly set forth, a mixture comprising isomers of xylene is carefully distilled in a rectifying column beyond a stage at which a further distillate fraction thereof exhibits a decrease in its freezing point; that is, somewhat beyond a distillation point at which successively collected distillate fractions indicate that a fraction of lowest freezing point has been reached and which may or may not represent a eutectic mixture of its constituent isomers. At such time as the freezing points of the condensed fractional distillates so-produced begin to rise and particularly during that stage at which the freezing point of a condensate corresponds closely to the freezing point of ortho-xylene, namely, at —26° and —27° C., such condensate, or condensates, is separately collected, and is found to average above 90% and as high as 98% ortho-xylene.

In the course of distillation, certain reflux ratios are preferably maintained and, at preferred predetermined stages, the employed reflux ratio is increased. It is found desirable to employ reflux ratios of at least about 13:1 at stages beyond that at which a said distillate fraction of lowest freezing point is obtained. In the initial stages of distillation, the reflux ratio may be at about 10:1. The latter may be maintained past the stage at which a said distillate fraction of lowest freezing point is formed but, in any event, when the freezing point of a condensate fraction reaches about —55° C., the reflux ratio is preferably increased to 15:1. A highly desirable point at which the reflux ratio is again increased is when the freezing point of the condensate rises to or is about —45° C. when about a 20:1 reflux ratio is employed at least until a fractional condensate shows an ortho-xylene content of at least 90%. This may be maintained during the remaining period of distillation and, if necessary to maintain the high purity of product, during the entire separate collection of the ortho-xylene of above 90% purity.

In the distillation of a xylene mixture of the present origin, distillation in a batch still is used to advantage. Under certain circumstances and with suitable adjustment a continuous still may be employed.

Improved results and yields are obtained when mixtures containing isomeric xylenes are distilled in the presence of an organic liquid that boils at a temperature higher than said xylenes; for example, the heavy solvent fraction of light oil or a heavy petroleum oil, or the like. The organic liquid should have a boiling point or a boiling point range higher than that of the xylene mixture under treatment and should be separable therefrom by distillation. The proportion of the organic liquid mixed with a xylene mixture may be widely varied to obtain the beneficial results therefrom.

Also, improved results are obtained by thoroughly purifying the light oil or a xylene cut therefrom or both, by washing with sulfuric acid or other light oil purifying agent.

By way of illustrating the present invention, in a typical plant-run for coke-oven light oil, crude light oil is washed with two to five per cent of concentrated sulfuric acid, the sludge formed is removed, and the acid-treated oil is washed with a dilute alkali solution to neutralize surplus free acid. The so-treated oil is distilled to obtain a fraction rich in xylenes, generally referred to as a xylene cut. This xylene fraction is, to advantage, again washed successively with further acid and alkali solutions as is done in the washing of the original crude light oil.

The washed xylene fraction is, also to advantage, prior to further distillation treatment, mixed with about 10% more or less heavy solvent obtained in light oil distillation. The heavy solvent is preferably previously acid and alkali washed. Heavy solvent has approximately the following distillation characteristics:

| | |
|---|---|
| First drop | 151.0° C |
| 5% | 154.0° C |
| 50% | 161.0° C |
| 90% | 180.0° C |
| Dry | 198.0° C |

The mixture of the xylene fraction and heavy solvent is advantageously subjected to batch distillation in apparatus of the type shown in the accompanying more or less diagrammatic drawing, in which a still 1 is provided with, among other appurtenances, a charge inlet 2, a double nest 3 and 4 of indirect steam coils, a direct steam inlet 5 and a pressure gauge 6. The indirect steam inlet 7 is provided with a pressure gauge. The direct steam inlet 5 is optional and generally found unnecessary. The still 1 is charged to a suitable depth well over the surface of the coils.

Vapors from the still 1 are conducted into a rectifying column 8 through a vapor pipe 9. The column 8 is provided with thirty-five trays 10 which in turn are provided with standard bubble caps 11. Suitable connections 12 are made with a recording thermometer (not shown). A reflux inlet pipe 13 is connected to the column above the top tray and to a pump having a capacity of substantially 1500 gallons per hour and above. A vapor outlet pipe 14 leads from the top of the column to a condenser 15 connected to a vacuum system and to suitable receivers not shown. Facilities are provided for sampling the condensate.

In the initial period of distillation of the xylene fraction, particularly if it contains benzene and/or toluene, a reflux ratio of about 10:1 is employed until the freezing point of the distillate has dropped to about $-55°$ C. The reflux ratio is then increased to about 15:1. This is maintained until the freezing point has risen to about $-45°$ C. when the reflux ratio is again increased to 20:1. The latter may be maintained throughout the stage designated as the ortho-xylene plateau. During the latter stage the distillate is separately collected and tested at intervals to make certain that the freezing point of this distillate does not vary appreciably from $-26°$ C. or $-27°$ C. Distillates are thereby obtained which consistently run as high as 98% ortho-xylene.

It is of interest here to note and to emphasize for the benefit of those skilled in the art that the prior practice of controlling a distillation, the collection of distillate products, and the composition of the latter solely by the range of temperatures at which they are distillable is entirely inadequate and even misleading for the present purpose which requires close, accurate, and rapid control of the freezing points of collected fractions during the distillation itself, otherwise high yields of the present product can not be obtained. This will be better appreciated when it is realized that 95% ortho-xylene products have been prepared, as above described in the specific example, having actual distillation ranges as divergent as those represented by a temperature range of from 2° C. to 6.5° C. as determined in apparatus universally accepted as standard.

What is claimed is:

1. A process of preparing ortho-xylene of high purity from light oil obtained by the destructive distillation of fuel, which process comprises distilling such light oil and obtaining therefrom a distillate rich in isomeric xylenes, from which distillate a xylene mixture of a lower freezing point than that of said distillate is distillable upon further distillation, subjecting the said distillate to distillation beyond a stage at which a further distillate fraction decreases in freezing point, after said stage continuing the distillation under conditions which are the equivalent of distilling in a column with thirty-five trays and while employing a reflux ratio of at least about 13:1, and separately collecting a distillate fraction having a freezing point corresponding closely to the freezing point of pure ortho-xylene, thereby obtaining ortho-xylene of above ninety per cent purity.

2. A process of preparing ortho-xylene of high purity from light oil obtained by the destructive distillation of fuel, which process comprises distilling such light oil and obtaining therefrom a distillate rich in isomeric xylenes, from which distillate a xylene mixture of a lower freezing point than that of said distillate is distillable upon further distillation, subjecting the said distillate to distillation beyond a stage at which a further distillate fraction decreases in freezing point, after said stage continuing the distillation under conditions which are the equivalent of distilling in a column with thirty-five trays and while employing a reflux ratio of at least about 13:1 and while increasing it to substantially 20:1, and separately collecting a distillate fraction having a freezing point corresponding closely to the freezing point of pure ortho-xylene, thereby obtaining ortho-xylene of above ninety per cent purity.

3. A process of preparing ortho-xylene of high purity from light oil obtained by the destructive distillation of fuel, which process comprises distilling such light oil and obtaining therefrom a xylene fraction containing isomeric xylenes, adding to the xylene fraction hydrocarbon oil that boils initially at a temperature higher than the said xylene fraction and is capable of separation therefrom by distillation, subjecting the xylene fraction in the presence of the said hydrocarbon oil to distillation beyond a stage at which a further distillate mixture of xylenes decreases in freezing point, after said stage continuing the distillation under conditions which are the equivalent of distilling in a column with thirty-five trays and while employing a reflux ratio of at least about 13:1, and separately collecting a narrowly cut distillate fraction having a freezing point corresponding closely to the freezing point of pure ortho-xylene, thereby obtaining ortho-xylene of above ninety per cent purity.

4. A process of preparing ortho-xylene of high purity from light oil obtained by the destructive distillation of fuel, which process comprises distilling such light oil and obtaining therefrom a distillate rich in isomeric xylenes, from which distillate a xylene mixture of a lower freezing point than that of said distillate is distillable upon further distillation, subjecting the said distillate to distillation beyond a stage at which a further distillate fraction decreases in freezing point, after said stage continuing the distillation in a batch still under conditions which are the equivalent of distilling in a column with thirty-five trays and while employing a reflux ratio of at least about 13:1, and separately collecting a distillate fraction having a freezing point corresponding closely to the freezing point of pure ortho-xylene, thereby obtaining ortho-xylene of above ninety per cent purity.

5. A process of preparing ortho-xylene of high purity from light oil obtained by the destructive distillation of fuel and that has been washed successively with acid and alkali solutions, which process comprises distilling the washed light oil and obtaining therefrom a xylene fraction containing isomeric xylenes, purifying the xylene fraction by successive acid and alkali washings, adding to the thus purified xylene fraction hydrocarbon oil that boils initially at a temperature higher than the said xylene fraction and is capable of separation therefrom by distillation, subjecting the purified xylene fraction in the presence of the said hydrocarbon oil to distillation in a batch still beyond a stage at which a further distillate mixture of xylenes decreases in freezing point, continuing the distillation under conditions which are the equivalent of distilling in a column with thirty-five trays and with a reflux ratio of at least about 13:1, separately collecting a distillate fraction having a freezing point corresponding closely to the freezing point of pure ortho-xylene and thereby obtaining ortho-xylene of above ninety per cent purity.

6. A process of preparing ortho-xylene of high purity from a mixture containing isomeric xylenes, which process comprises distilling the said mixture containing said isomeric xylene while under conditions which are the equivalent of distilling in a column with thirty-five trays and employing a reflux ration of at least about 13:1 beyond a stage at which a further distillate fraction decreases in freezing point, and separately collecting a distillate fraction having a freezing point corresponding closely to the freezing point of pure ortho-xylene, thereby obtaining ortho-xylene of above ninety per cent purity.

7. A process of preparing ortho-xylene of high purity from a mixture containing isomeric xylenes, which process comprises distilling the said mixture containing said isomeric xylenes while under conditions which are the equivalent of distilling in a column with thirty-five trays and employing a reflux ratio of at least about 13:1 and while thereafter increasing the reflux ratio to substantially 20:1 and distilling beyond a stage at which a further distillate fraction decreases in freezing point, and separately collecting a distillate fraction having a freezing point corresponding closely to the freezing point of pure ortho-xylene, thereby obtaining ortho-xylene of above ninety per cent purity.

8. A process of preparing ortho-xylene of high purity from a mixture containing isomeric xylenes, which process comprises subjecting a mixture containing isomeric xylenes to a distillation treatment in a batch still in the presence of hydrocarbon oil that boils initially at a temperature higher than a mixture of the said xylenes and is capable of separation therefrom by distillation, while under conditions which are the equivalent of distilling in a column with thirty-five trays and employing a reflux ratio of at least about 13:1, continuing distillation beyond a stage at which a further distillate fraction of the xylenes decreases in freezing point, and subsequently separately collecting a distillate fraction having a freezing point corresponding closely to the freezing point of pure ortho-xylene, thereby obtaining ortho-xylene of above ninety per cent purity.

9. A process of preparing ortho-xylene of high purity from a mixture containing isomeric xylenes, which process comprises distilling a mixture containing said isomeric xylenes beyond a stage at which a distillate fraction is condensible having a freezing point of at highest about −55° C., while under conditions which are the equivalent of distilling in a column with thirty-five trays and employing a reflux ratio of at least about 13:1, and until a stage is reached at which a distillate is obtained having a freezing point in the neighborhood of −45° C. during which latter stage the reflux ratio is increased to about 20:1, continuing the distillation while employing the latter reflux ratio and separately collecting a distillate fraction having a freezing point corresponding closely to the freezing point of pure ortho-xylene, thereby obtaining ortho-xylene of above ninety per cent purity.

WILLIAM L. GLOWACKI.

REFERENCES CITED

The following references are of record in the file of this patent:

UNITED STATES PATENTS

| Number | Name | Date |
| --- | --- | --- |
| 1,701,988 | Torrey | Feb. 12, 1929 |
| 1,940,065 | Spannagel | Dec. 19, 1933 |
| 2,085,287 | Bailey | June 29, 1937 |

OTHER REFERENCES

Nakatsuchi, Journal Society of Chemical Industry, Japan, volume 33, Supplemental Binding, pages 65-B, 66-B. (Copy in Scientific Library.)

Badger et al., "Elements of Chemical Engineering," Second edition, published 1936 by McGraw-Hill Book Company, New York, N. Y., pages 340 to 353. (Copy in Library of Congress.)

Robinson, "Elements of Fractional Distillation," First edition, published 1922 by McGraw-Hill Book Company, New York, N. Y., pages 82 to 86. (Copy in Div. 25.)

Morton, "Laboratory Technique in Organic Chemistry," First edition, published 1938 by McGraw-Hill Book Co., New York, N. Y., pages 75, 76, 82 to 86, and 91 to 98. (Copy in Div. 25.)